(12) United States Patent
Smith

(10) Patent No.: US 6,447,025 B1
(45) Date of Patent: Sep. 10, 2002

(54) OILFIELD TUBULAR CONNECTION

(75) Inventor: Jackie E. Smith, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 09/569,458

(22) Filed: May 12, 2000

(51) Int. Cl.[7] .......................... F16L 37/00; F16L 25/00
(52) U.S. Cl. .................. 285/333; 285/334; 285/390
(58) Field of Search ........................ 285/333, 334, 285/355, 390

(56) References Cited

U.S. PATENT DOCUMENTS

| | | | | |
|---|---|---|---|---|
| 3,754,609 | A | * 8/1973 | Garrett | 175/323 |
| 4,508,375 | A | * 4/1985 | Patterson et al. | 285/334 |
| 4,549,754 | A | 10/1985 | Saunders et al. | |
| 4,875,713 | A | * 10/1989 | Cartensen | 285/55 |
| 6,174,000 | B1 | * 1/2001 | Nishi et al. | 285/333 |

FOREIGN PATENT DOCUMENTS

| | | | | |
|---|---|---|---|---|
| JP | 404015385 | A | * | 1/1992 |
| JP | 405231569 | A | * | 9/1993 |

* cited by examiner

*Primary Examiner*—Douglas C. Butler
*Assistant Examiner*—Xuan Lan Nguyen
(74) *Attorney, Agent, or Firm*—Browning Bushman, P.C.

(57) ABSTRACT

An oilfield tubular member 10 includes pin member 12 and box member 14 each having a tapered thread 18, 20, 70, 72. The pin thread 18 has a root 28, a crest 26, a pressure flank 34 and stab flank 36. The box thread has root 32, a crest 30, a pressure flank 84 and stab flank 86. The pin crest 26 has a stab flank pin crest radius 40 and a pressure flank pin crust radius 38 which is at least twice the radius 40. The improved oilfield connection minimizes damage to the connection during misalignment of the pin member and box member.

14 Claims, 2 Drawing Sheets

OILFIELD TUBULAR CONNECTION

FIELD OF THE INVENTION

The present invention relates to oilfield tubular threaded connections. More particularly, this invention relates to improvements in the thread on both the pin and box of the threaded connection for minimizing thread wear and galling.

BACKGROUND OF THE INVENTION

Manufacturers of oilfield tubulars are continually seeking improvements which will satisfy the customers needs. One of the major areas of customer complaints is excessive thread wear and/or galling. When excessive wear and/or galling problems occur, it is not known, in many cases, whether that galling and thread wear occurred due to unusual conditions under which the threaded connection was made up and/or broken apart, whether the problem may relate to quality control of the threaded connection, or whether some change might be made in the thread design to minimize or eliminate the problem. In many cases, the existence of excessive wear or galling can be noted, but the reason for the problem cannot be determined. Even when a wear and/or galling condition attributable to thread design and/or a makeup condition is recognized, those skilled in the art know a design change to correct one problem may create more serious problems in other areas.

Customers of oilfield products have noted that, under some conditions, tool joint wear, particularly in the middle sections of the threads of the tool joints, resulted in sharp crests while the end sections were relatively undamaged. Customer complaints regarding thread wear and galling sometimes referred to "whiskers" which are fine metal whiskers created during a makeup operation under severe thread wear or galling conditions.

Those skilled in the art appreciate that excessive thread wear and galling can cause the oilfield tubular, which may be tubing or casing, to be rejected for use in the well. In other cases the worn thread may be "refinished". Oilfield tool joints are conventionally manufactured so that, should the thread be damaged or worn excessively, an entirely new thread can be recut on the tool joint. Even this solution has its own problems, however, since costs are associated with recutting the thread, and since new threads can be recut on a tool joint a limited number of times before the tool joint body lacks the dimensions which would allow another thread to be cut on the tool joint. A conventional pressure flank crest radius and both flank crest radius or a tool joint is thus disclosed in U.S. Pat. No. 4,549,754.

The disadvantages of the prior art are overcome by present invention, and improved oilfield connection is hereafter disclosed which minimizes thread wear and/or galling problems associated with many prior art connections.

SUMMARY OF THE INVENTION

The present invention relates to an improved threaded tubular connection, and particularly to the thread on the pin and box of the tubular connection, which may be a tool joint. Those familiar with oilfield tubulars recognize that connected threads on both the pin and the box have both a nonpressure or stab flank and a pressure or load flank, and that these flanks normally serve different purposes.

The present invention recognizes that any misalignment between the pin and the box may cause the corner of the thread flank on the pin to engage the flat thread surface of the thread flank on the box. The weight to the pipe or other tubular hanging in an elevator may thus be transmitted through this corner contact. When the pin is subsequently rotated in the box to make up the connection, the sharp corner of the thread flank on the pin may wipe away the thread compound and thus gouge or scrape the adjacent thread on the box, causing high thread wear and damage.

According to the present invention, the thread on both the pin and box is modified to substantially increase the crest radius of the stab flank of the thread. According to a preferred embodiment, the crest radius on the pressure flank of the thread is not modified, however, so that a high pressure flank bearing area is maintained. According to preferred embodiments, the crest radius of the stab flank of the thread is approximately four times the crest radius of the pressure flank, and in most applications would be at least two times and less than six times the radius of the pressure flank. In an exemplary application, the radius on the pressure flank is maintained at a conventional 0.015 inches, while the radius on the stab flank is increased to 0.065 inches.

An object of the present invention is to provide an improved oilfield tubular threaded connection which minimizes galling and/or high thread wear. A related object of the invention is improved life and reliability of an oilfield tubular connection.

It is a feature of the present invention that the improved threaded connection may be provided on tool joints which are conventionally subjected to high stress applications.

It is another feature of this invention that thread wear and galling may be minimized while still maintaining the bearing area of the pressure flank at its conventional level.

It is a significant advantage of the present invention that a thread modified pin member may be used on a conventional box member, and that similarly the improved thread design of the present invention may be employed on a box and may be then used with a conventional pin. Another significant advantage of the invention is that thread wearing and galling are minimized with no significant change in the cost of manufacturing or repairing the thread on either the pin or the box.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
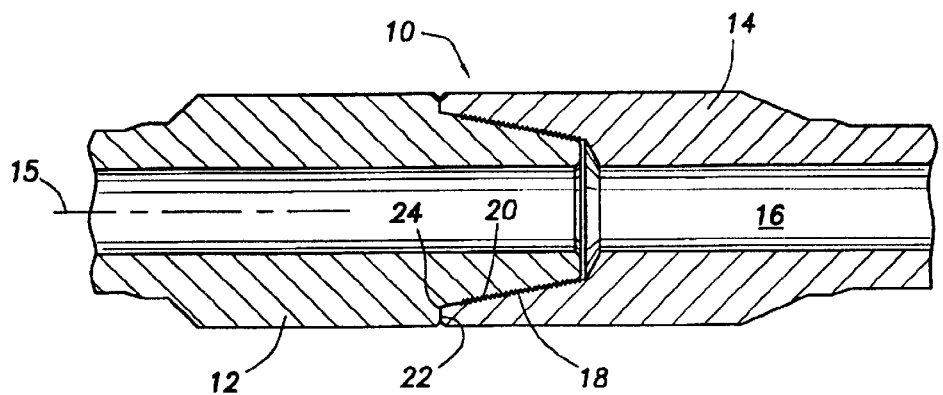
FIG. 1 is a longitudinal sectional view of a threaded tool joint according to the present invention.

An improved oilfield tubular threaded connection is disclosed, and particularly a threaded connection for tool joints conventionally used to connect pipe used in drilling operations in the petroleum industry. As shown in FIG. 1, the threaded connection is a tool joint connection comprising a male pin member 12 which makes up into a female box member for 14. The pin and box members of the tool joint may each be welded to drill pipe and provide the connection for assembling the pipe together. Both the pin and the box member thus have an aligned throughbore 16 which preferably has the same diameter as that of the throughbore in the pipe welded to the connection. The throughbore and thus the connection 10 has a central axis 15. The present invention is particularly concerned with an improved thread design for reducing thread wear and galling during the make up or break out of the tool joint.

As shown in FIG. 1, the pin member 12 has a tapered pin connection thread 18 which makes up to a tapered box connection thread 20. The threaded connection is customarily connected so that the shoulder 22 on the pin member makes up in tight engagement with the end face 24 of the box member.

Figure 2:
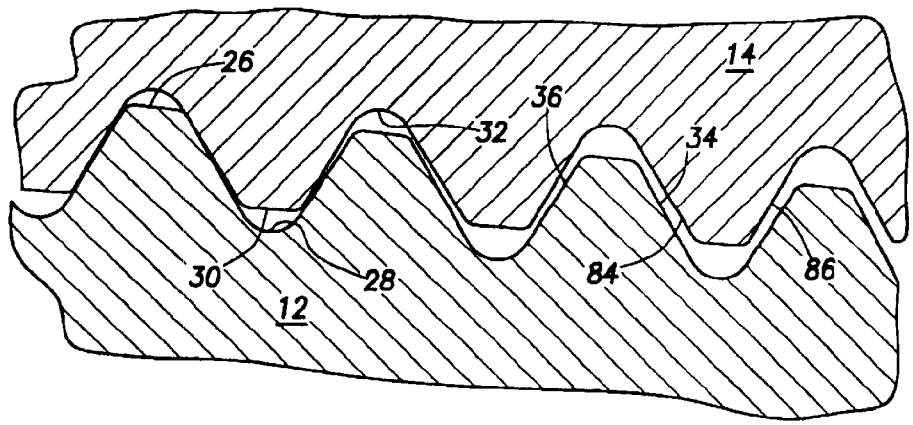
FIG. 2 is an enlarged sectional view of a prior art pin and box thread during misalignment.

The threads as shown in FIG. 2 have a configuration common to prior art threads in a tool joint. Those skilled in the art will thus appreciate that the thread in the pin 12 has a crest 26 and a root 28. The pin thread also has a pressure or load flank 36 and a stab or unloaded flank 34. The thread flanks 34, 36 are thus each spaced between the pin thread crest 26 and the pin thread root 28.

The box 14 has a similar thread which has a box crest 30 and box root 32, with a pressure flank 86 and a stab flank 84. When the threaded connection is downhole, the pressure flank of the pin thread is in planar engagement with the pressure flank of the box thread. Similarly, the stab flank of the pin thread preferably is in planar engagement with the stab flank of the box thread.

Those skilled in the art will appreciate that due to the environment in which oilfield tubular threads are made up, there may be significant misalignment between the axis of the pin connection and the axis of the box connection. This misalignment is depicted in FIG. 2, with the depicted alignment being exaggerated for reasons explained below.

Figure 3:
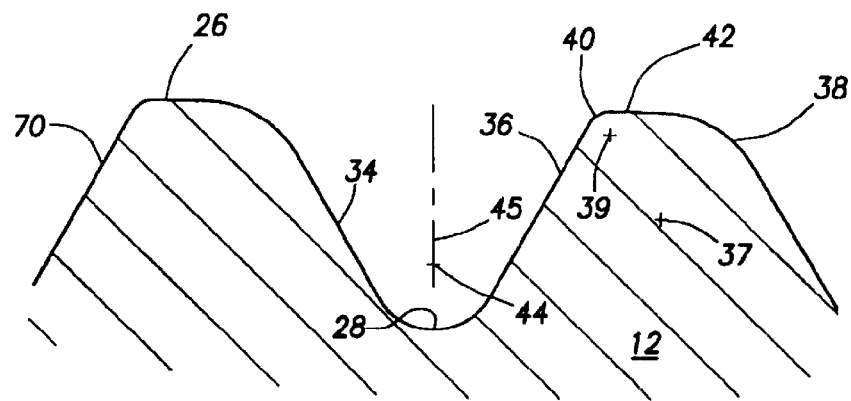
FIG. 3 is an enlarged cross-sectional view of the pin thread shown in FIG. 1.

FIG. 3 depicts the pin thread 70 having pin crest 26, pin root 28, pressure flank 36, and stab flank 34. Pressure flank 36 and stab flank 34 are equally spaced from a thread centerline 45 which passes very near or through a centerpoint 44 of the pin root 28. Centerline 45 is thus perpendicular to the centerline 15 of the tool joint. The equal or substantially equal spacing between the pressure flank 36 and the stab flank 34 from the centerline 45 thus increases with radial spacing from the central axis 15 of the pin 12. As shown in FIG. 3, the pin root 28 has a centerpoint 44 which lies along centerline 45.

FIG. 3 depicts the pin thread 70 having a pressure flank pin crest radius 40 and stab flank pin crest radius 38. The radius 40 thus has a center 39 and the radius 38 has center 37, as shown in FIG. 3. According to the present invention, the stab flank pin crest radius is substantially greater that the pressure flank pin crest radius. In many applications, the radii 38, 40 of the pin crest 26 will be interconnected by a flat surface 42 which may be parallel to the pitch line of the tapered thread. In less preferred embodiments, the flat surface 42 may be inclined relative to the taper of the thread, or the radius 38 may be increased to the extent such that radius 38 merges with radius 40.

According to the prior art, the pressure flank pin crest radius was equal to the stab flank pin crest radius. In a typical applications, both the pin crest radius and stab flank radius were 0.015 inches. Referring again to FIG. 2, the present invention recognizes that during misalignment, the stab flank pin crest radius effectively made corner contact with the box flank 84, and the stab flank box radius similarly made point or line contact with the pin flank 36. This contact is believed to be a significant factor which led to excessive wear and galling problems on prior art oilfield tubular connections.

Although a box thread of the size corresponding to the pin thread 70 shown in FIG. 3 is not depicted, those skilled in the art will appreciate that in most if not all connections, the box member 14 will be similarly modified so that the stab flank box crest radius was substantially greater than the pressure flank box crest radius.

In a typical embodiment, the pin thread 70 as shown in FIG. 3 will have a stab flank 34 angled at approximately 30 degrees relative to centerline 45, and a pressure flank 36 similarly spaced at approximately 30 degrees relative to centerline 45. A thread may, for example, have a stab flank angle of about 32 degrees, while another thread may have a stab flank angle of about 35 degrees. For tool joints, those skilled in the art will appreciate that the pin thread and the box thread each have a thread flank angle (the inclusive angle between flank 34 and flank 36) from about 60 degrees to about 90 degrees. The center 44 of the root 28 preferably has a radius of from 0.025 inches to 0.042 inches. The radius 40 has a 0.015 inch radius, which is consistent with the radius of the prior art thread. Those skilled in the art appreciate that all corners in a tool joint thread conventionally have a radius of 0.015 inches. The stab flank pin crest radius 38 according to one embodiment of the invention is approximately 0.065 inches.

According to the present invention, the stab flank pin crest radius is at least twice the pressure flank pin crest radius. The stab flank pin crest radius preferably is less than six times the pressure flank pin crest radius, and preferably from about three to about five times the pressure flank pin crest radius. The same relationship preferably applies to the stab flank box crest radius with respect to the pressure flank box crest radius. The increased radius will significantly decrease the contract stress caused by the weight of the oilfield tubular or stand of the tubular being added to the tubular string when there is misalignment of the pin and box members.

If the radius 38 were to increase by more than six times the radius 40, the benefits of further increasing the radius to maximize the bearing area during engagement of surface 38 with stab flank 84 would only marginally increase.

Figure 4:
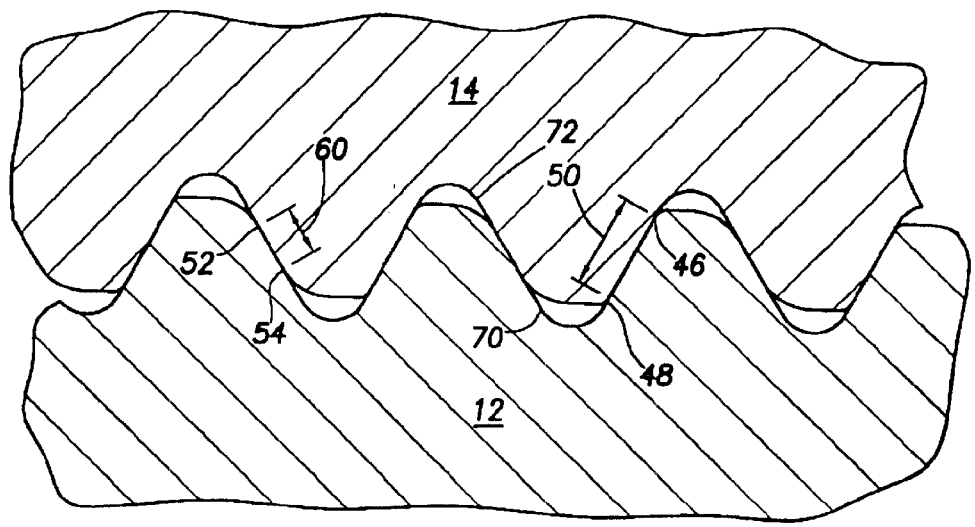
FIG. 4 is an enlarged sectional view of the pin and box thread according to the present invention.

According to an exemplary embodiment of the invention as shown in FIG. 4 with the pin thread 70 and the box thread 72 each having a large crest stab flank radius, a large pressure flank bearing area 50 extends between the points 46, 48, which are the points of planar engagement/disengagement between the pressure flank on the pin number 12 and pressure flank on the box member 14. By increasing the radius between the stab flank and the crest, the stab flank bearing area 60 between the corresponding points 52, 54 has been reduced compared to the stab flank bearing area of conventional tool joint tubular threads, but this reduction in the stab flank bearing area is acceptable.

A prior art tool joint with a pressure flank pin crest radius equal to the stab flank pin crest radius resulted in a stab flank bearing area which was 15 percent greater than the pressure flank bearing area. According to the modified thread design as shown in FIG. 4, the pressure flank area 50 was maintained, while the stab flank bearing area decreased to approximately 60 percent of the pressure flank bearing area. If the radius 40 were increased at an equal rate with the radius 38, the pressure flank area drastically reduces and soon drops below acceptable levels. Accordingly, a conventional machining radius 40 thus may be maintained for the pressure flank pin crest radius.

In many cases, the preferred pressure flank pin crest radius will thus be from about 0.013 inches to 0.017 inches. The pin root radius 28 for many applications will be from about two to about three times the pressure flank pin crest radius. The pin thread and the box thread on a preferred tool joint may have a taper of approximately 0.75 to 3.0 inches per foot, inches to three to five threads per inch.

Although the invention has been described in detail for preferred embodiments, with particular emphasis upon a particular embodiment, it should be understood that various changes may be made to pin thread or the box thread without departing from the spirit of the invention. Accordingly, the purpose-of the following claims is to cover such changes and modifications that fall within the spirit and scope of the invention.

What is claimed is:

1. An oilfield tubular connection for threadably interconnecting a tapered pin thread with a tapered box thread, the connection comprising:

the pin member having a central throughbore and the tapered pin thread, the pin thread having a pin root and a pin crest, the pin thread also having a pin pressure flank and a pin stab flank each spaced between the pin root and the pin crest, each of the pin thread and the box thread have a thread flank angle from about 60 degrees to about 90 degrees, the pin crest having a stab flank pin crest radius and a pressure flank pin crest radius, the stab flank pin crest radius being from three to five times the pressure flank pin crest radius; and a box member having a central box throughbore and a tapered box thread, the box thread having a box root and a box crest, the box thread further having a box pressure flank and a box stab flank each spaced between the box root and the box crest, the box crest having a stab flank box crest radius and a pressure flank box crest radius, the stab flank box crest radius being from three to five times the pressure flank box crest radius, thereby minimizing damage to the connection during misalignment of the pin member and the box member.

2. The oilfield tubular connection as defined in claim 1, wherein the pin member and the box member form a tool joint, the pin member having a tool joint shoulder, and the box member having a tool joint end face for engagement with the tool joint shoulder.

3. The oilfield tubular connection as defined in claim 1, wherein the pin pressure flank and the pin stab flank are substantially equally spaced from a thread centerline which passes through a centerpoint of the pin root, the substantially equal spacing increasing with radial spacing from a central axis of the connection.

4. The oilfield tubular connection as defined in claim 1, wherein the pin root radius is from two to three times the pressure flank pin crest radius.

5. The oilfield connection as defined in claim 1, wherein the pressure flank pin crest radius is from 0.013 inches to 0.017 inches.

6. An oilfield tubular connection for threadably interconnecting a tapered pin thread with a tapered box thread, the connection comprising:

the pin member having a central throughbore and the tapered pin thread, the pin thread having a pin root and a pin crest, the pin thread also having a pin pressure flank and a pin stab flank each spaced between the pin root and the pin crest, the pin pressure flank and the pin stab flank being equally spaced from a thread centerline which passes through a centerpoint of the pin root, the equal spacing increasing with radial spacing from a central axis of the connection, the pin crest having a stab flank pin crest radius and a pressure flank pin crest radius, the stab flank pin crest radius being from three to five times the pressure flank pin crest radius; and a box member having a central box throughbore and a tapered box thread, the box thread having a box root and a box crest, the box thread further having a box pressure flank and a box stab flank each spaced between the box root and the box crest, the box crest having a stab flank box crest radius and a pressure flank box crest radius, the stab flank box crest radius being from three to five times the pressure flank box crest radius, thereby minimizing damage to the connection during misalignment of the pin member and the box member.

7. The oilfield tubular connection as defined in claim 6, wherein the pin member and the box member form a tool joint, the pin member having a tool joint shoulder, and the box member having a tool joint end face for engagement with the tool joint shoulder.

8. The oilfield tubular connection as defined in claim 7, wherein each of the pin thread and the box thread have a thread flank angle from about 60 degrees to about 90 degrees.

9. The oilfield tubular connection as defined in claim 6, wherein the pin root radius is from two to three times the pressure flank pin crest radius.

10. The oilfield connection as defined in claim 6, wherein the pressure flank pin crest radius is from 0.013 inches to 0.017 inches.

11. A tool joint for threadably interconnecting a tapered pin thread with a tapered box thread, the tool joint comprising:

the pin member having a central throughbore, a tool joint shoulder and the tapered pin thread, the pin thread having a pin root and a pin crest, the pin thread also having a pin pressure flank and a pin stab flank each spaced between the pin root and the pin crest, the pin crest having a stab flank pin crest radius and a pressure flank pin crest radius, the stab flank pin crest radius being from three to five times the pressure flank pin crest radius;

a box member having a central box throughbore, a tool joint end face for tight engagement with the tool joint shoulder, and a tapered box thread, the box thread having a box root and a box crest, the box thread further having a box pressure flank and a box stab flank each spaced between the box root and the box crest, the box crest having a stab flank box crest radius and a pressure flank box crest radius, the stab flank box crest radius being from three to five times the pressure flank box crest radius, thereby minimizing damage to the connection during misalignment of the pin member and the box member; and each of the pin thread and the box thread have a thread flank angle from about 60 degrees to about 90 degrees.

12. The tool joint as defined in claim 11, wherein the pin pressure flank and the pin stab flank are substantially equally spaced from a thread centerline which passes through a centerpoint of the pin root, the substantially equal spacing increasing with radial spacing from a central axis of the connection.

13. The tool joint as defined in claim 11, wherein the pin root radius is from two to three times the pressure flank pin crest radius.

14. The tool joint as defined in claim 11, wherein the pressure flank pin crest radius is from 0.013 inches to 0.017 inches.

* * * * *